US 9,369,953 B2

(12) United States Patent
Ekici et al.

(10) Patent No.: US 9,369,953 B2
(45) Date of Patent: *Jun. 14, 2016

(54) ASSISTED SYSTEM SCANNING WITH PAIRED DEVICES

(71) Applicant: BlackBerry Limited, Waterloo (CA)

(72) Inventors: Ozgur Ekici, Escondido, CA (US);
Muhammad Khaledul Islam, Ottawa (CA)

(73) Assignee: BlackBerry Limited, Waterloo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/862,897

(22) Filed: Sep. 23, 2015

(65) Prior Publication Data
US 2016/0014683 A1    Jan. 14, 2016

Related U.S. Application Data

(63) Continuation of application No. 14/082,223, filed on Nov. 18, 2013, now abandoned, which is a continuation of application No. 13/360,161, filed on Jan. 27, 2012, now Pat. No. 8,606,265.

(51) Int. Cl.
*H04W 48/16*    (2009.01)
*H04W 52/02*    (2009.01)
(Continued)

(52) U.S. Cl.
CPC .......... *H04W 48/16* (2013.01); *H04W 52/0206* (2013.01); *H04W 76/023* (2013.01); *H04W 84/18* (2013.01)

(58) Field of Classification Search
CPC .. H04W 48/16; H04W 84/18; H04W 52/0206
USPC ....................................................... 455/434
See application file for complete search history.

(56) References Cited

U.S. PATENT DOCUMENTS 8,606,265 B2 * 12/2013 Ekici ................. H04W 52/0206
455/16
2005/0047356 A1    3/2005   Fujii et al.
(Continued)

FOREIGN PATENT DOCUMENTS

| EP | 1246487 | 10/2002 |
| EP | 1959697 | 8/2008 |
| GB | 2410153 | 7/2005 |
| WO | 2005/008969 | 1/2005 |
| WO | 2007/147451 | 12/2007 |
| WO | 2011056102 A1 | 5/2011 |

OTHER PUBLICATIONS

European Patent Office, European Search Report on Application No. 12152890, Issued on Jun. 19, 2012.
(Continued)

*Primary Examiner* — Kwasi Karikari
(74) *Attorney, Agent, or Firm* — Moffat & Co.

(57) ABSTRACT

A method in a first wireless device, the method performing wireless network scanning to discover available wireless networks; and communicating results of the scanning to a second wireless device, the results containing information to enable the second wireless device to connect to at least one of the available wireless networks without the second wireless device having to perform the same wireless network scanning or reduce the amount of scanning required to connect to at least one of the available wireless network. Also a method in a first wireless device, the method receiving results of wireless network scanning performed on a second wireless device, the results containing information enabling the first wireless device to connect to at least one available wireless network discovered during the scanning without the first wireless device having to perform the same wireless network scanning.

20 Claims, 5 Drawing Sheets

(51) Int. Cl.
*H04W 76/02* (2009.01)
*H04W 84/18* (2009.01)

(56) References Cited

U.S. PATENT DOCUMENTS

| | | | |
|---|---|---|---|
| 2007/0183374 A1* | 8/2007 | Classon | H04W 36/0083 370/338 |
| 2008/0045210 A1 | 2/2008 | Kaaja et al. | |
| 2008/0268855 A1 | 10/2008 | Hanuni et al. | |
| 2010/0124929 A1 | 5/2010 | Lee | |
| 2011/0158441 A1 | 6/2011 | Batra | |
| 2011/0256869 A1 | 10/2011 | Zhang et al. | |

OTHER PUBLICATIONS

Gryazin, E.A., "Service Discovery in Bluetooth", retrieved from http://citeseer.ist.psu.edu/392311.html, retrieved on Dec. 22, 2000.
Nokia E72 User Guide, "Prolong battery life", at p. 12, at url—http:nds1.nokia.com/phones/files/guides/Nokia_E72_UG_en.pdf, retrieved on Oct. 27, 2011.
Demaria, Elena, "Requirements and scenarios for mobile network evolution" at url—http://open-innovation.alcatel-ucent.com/www/medieval/Publications/uploads/Talks/Demaria_MIRACLE_10.pdf, Nov. 2010.

\* cited by examiner

ASSISTED SYSTEM SCANNING WITH PAIRED DEVICES

RELATED APPLICATIONS

The present application is a continuation of U.S. patent application Ser. No. 14/082,223, filed Nov. 18, 2013, which is a continuation of U.S. patent application Ser. No. 13/360,161, filed Jan. 27, 2012 and issued as U.S. Pat. No. 8,606,265, the entire contents of all of which are incorporated herein by reference.

FIELD OF THE DISCLOSURE

The present invention relates generally to wireless devices, and more particularly to wireless system scanning in mobile communication devices.

BACKGROUND

Many different types of wireless devices exist today. Increasingly, many of these devices are mobile and powered by battery which has limited capacity compared to fixed wireless devices that may be powered directly from an electrical outlet. The battery-powered wireless devices include but are not limited to mobile phones, smart phones, laptop computers, and tablet computers. Users may carry and use more than one battery powered wireless device at once. For example, a user may carry and use both a smart phone and a tablet computer. It is possible for such devices to have one or more wireless capabilities in common. For example, two wireless mobile devices may both have cellular capabilities, wireless local area network (WLAN) or Wi-Fi™ capabilities, Bluetooth™ capabilities, etc.

Furthermore, it is possible for wireless devices that are located in proximity to one another to communicate directly with each other over an established communication link like Bluetooth™ or Universal Serial Bus (USB). In such an instance, these devices are hereinafter referred to as being "paired" together. The communication link between devices allows the devices to exchange information for one or more purposes. Such purposes can include the transfer of data or files from one device to another, the synchronization of applications or data such as email synchronization status and program settings, among others.

In some instances, a user's two wireless devices may attempt to use the same wireless access capability. Before a wireless connection can be established, it is common for a wireless device to carry out a scanning process in search of available networks. In such a situation, both devices will undertake a scanning process in search of available networks including user-owned cells, networks available on supported Radio Access Technologies (RATs) including cellular, WiFi, etc. This situation can be further described using the following example in which two devices wish to connect to a Wi-Fi network. In such instances, both devices will use their Wi-Fi radio in an attempt to find and connect to a Wi-Fi access point. This procedure involves active or passive scanning for Wi-Fi access points, and then if one is found, connecting to the access point. This work is energy intensive and consumes significant battery power of both devices.

BRIEF DESCRIPTION OF THE DRAWINGS

The present disclosure will be better understood having regard to the drawings in which.

DETAILED DESCRIPTION

Figure 1:
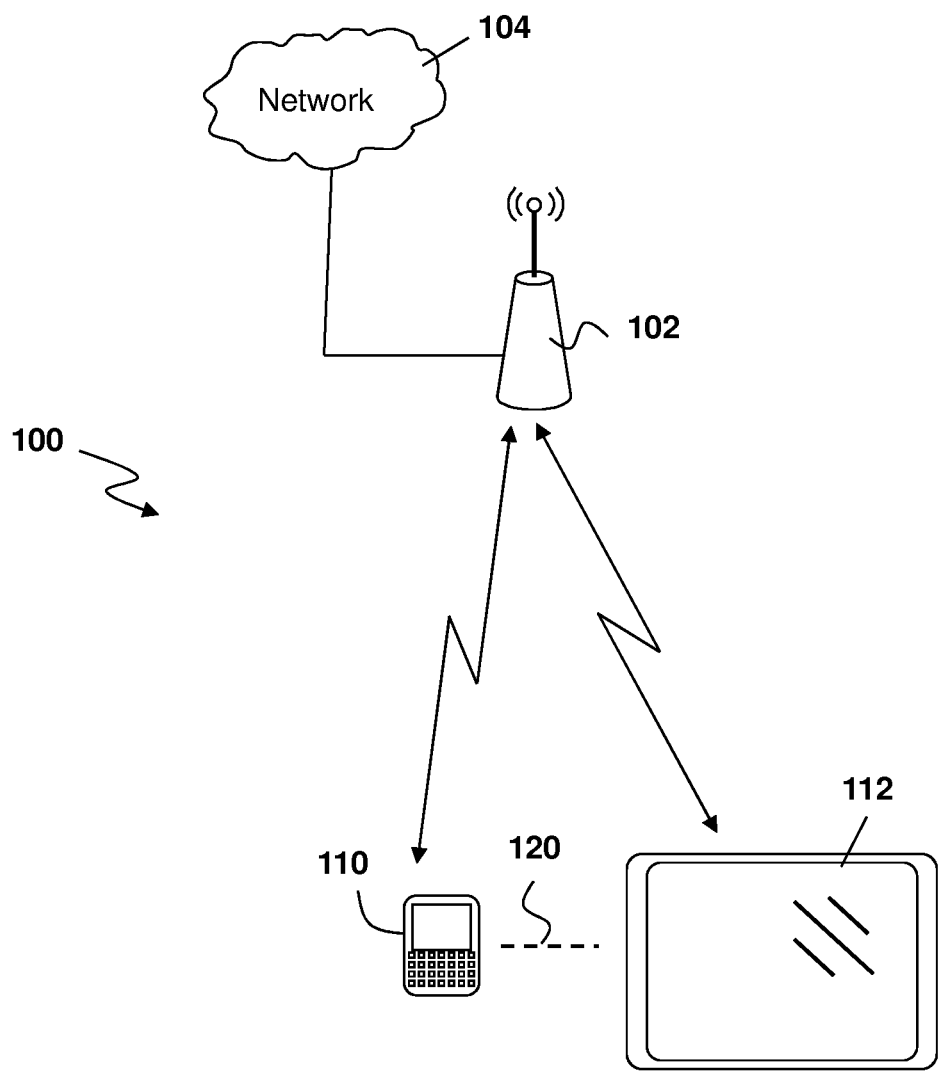
FIG. 1 is a block diagram representing an exemplary wireless network according to one aspect of the present disclosure.

The present disclosure provides a method in a first wireless device, the method comprising the steps of: performing wireless network scanning to discover available wireless networks; and communicating results of the scanning to a second wireless device, the results containing information to enable the second wireless device to connect to at least one of the available wireless networks without the second wireless device having to perform the same wireless network scanning.

The present disclosure further provides a method in a first wireless device, the method comprising the step of: receiving results of wireless network scanning performed on a second wireless device, the results containing information enabling the first wireless device to connect to at least one available wireless network discovered during the scanning without the first wireless device having to perform the same wireless network scanning.

The present disclosure further provides a wireless device comprising: a processor; a memory storing therein computer readable instructions; and at least one wireless communication interface for communicating with one or more wireless networks, wherein the processor is configured to execute the computer readable instructions to cause the wireless device to perform wireless network scanning to discover available wireless networks; and communicate results of the scanning to a second wireless device, the results containing information to enable the second wireless device to connect to at least one of the available wireless networks without the second wireless device having to perform the same wireless network scanning.

The present disclosure further provides a wireless device comprising: a processor; a memory storing therein computer readable instructions; and at least one wireless communication interface for communicating with one or more wireless networks, wherein the processor is configured to execute the computer readable instructions to cause the wireless device to receive results of wireless network scanning performed on a second wireless device, the results containing information enabling the first wireless device to connect to at least one available wireless network discovered during the scanning without the first wireless device having to perform the same wireless network scanning.

One or more embodiments of the present disclosure disclosed herein are described with reference to two wireless devices. However, this number of devices is not meant to be limiting. It is contemplated that the present disclosure may be implemented with three or more wireless devices.

In one aspect, the present disclosure provides for a wireless device, but the disclosure is not meant to be limited to any particular wireless device. Examples of wireless devices include but are not limited to data enabled cellular telephones, smart phones, personal digital assistants, tablet computers, and laptop computers.

The various features and components of the present disclosure are now described with reference to the Figures.

Reference is now made to FIG. 1, which shows a block diagram representing an exemplary wireless network 100 having a wireless access point 102 and first and second wireless devices 110, 112. Wireless access point or base station 102 can be an access point in any type of wireless network or technology, including but not limited to Wi-Fi, WiMAX™, a cellular network, and a home network. In addition, wireless access point or base station 102 may be connected to another network 104, such as for example a wireless local area network (WLAN), the internet, a telecommunications network, etc. Although only two wireless devices are shown in wireless network 100, in at least one embodiment network 100 can have one or more other computing devices.

In the present disclosure, the wireless devices may be of any type capable of wireless communications, including but not limited to data enabled cellular telephones, smart phones, personal digital assistants, tablet computers, and laptop computers. In at least one embodiment, one or more of the wireless devices are battery powered devices.

For example, wireless devices 110 and 112 depicted in FIG. 1 may be a tablet computer and a smart phone, respectively. It is becoming more common for a user to carry and operate two or more wireless devices. For instance, a user may prefer to use a smart phone for voice communications and text messaging, and to use a tablet computer for more involved tasks such as emailing, web browsing, document editing, virtual private networking, video conferencing, to name but a few. Thus in such cases where the two wireless devices are used by the same user, have similar user profile details and credentials, the devices will normally be located and operated in roughly the same physical location. As a result, the two wireless devices may be able to access one or more of the same wireless networks.

In some cases, the two or more wireless devices will be associated with the same entity or user. The entity could be a business or other organization, and the user could be an individual. It is possible that the devices are associated with a single user account. The person or entity with which a device is associated may be used in an identification and/or authentication procedure when there is an attempt to set up a communication link between two wireless devices. The establishment and use of a communication link between two proximally located wireless devices is discussed further below.

In at least one embodiment, each of the two wireless devices may have a wireless interface for carrying out wireless communications. The wireless interface can permit the wireless device to communicate with another equipment, such as an access point or a base station. One such example is wireless access point or base station 102 shown in FIG. 1. Each device may support one or more wireless technologies, such as Code Division Multiple Access (CDMA), Wideband CDMA (W-CDMA), Global System for Mobile (GSM), GSM Packet Radio Service (GPRS), Universal Mobile Telecommunications Service (UMTS), Evolution Data Only (EVDO), Long Term Evolution (LTE), LTE Advanced (LTE-A), High Speed Downlink Packet Access (HSDPA), Wi-Fi, and WiMAX. It is to be appreciated that this list is merely exemplary and is not meant to be limiting.

In addition to carrying out wireless communications as discussed above, it is contemplated in the present disclosure that the two wireless devices, which are located in proximity to one another, are capable of communicating with each other over a communication link. For example, FIG. 1 depicts a connection between devices 110, 112 via communication link 120. The communication link between devices allows the devices to exchange information for one or more purposes. Such purposes can include the transfer of data or files from one device to another, the synchronization of applications or data such as email and program settings, the establishment and control of wireless connections, and the collaboration of the devices to complete other tasks.

In some instances, a communication link will be or has been established between the two devices. In such a case, the two devices are hereinafter referred to as being "paired" together. In addition, the skilled person will appreciate that the communication link between the two devices can be unsecured or secured.

Communication link 120 between devices 110 and 112 may comprise any short or long range wired or wireless connection, and examples of such connections include Bluetooth™, universal serial bus (USB), Infrared Data Association (IrDA), Wi-Fi, Radio-frequency identification (RFID), Near Field Communication (NFC) connections. Other types of connections are possible.

In some instances, the two wireless devices will attempt to communicate over the same wireless network. For example, devices 110 and 112 may both attempt to connect to a Wi-Fi network. In this example, each of the two devices will use its radio autonomously (i.e. with no end user interaction) in an attempt to find and connect to a Wi-Fi access point. This process involves scanning for Wi-Fi access points, and then if one is found, establishing a connection with the access point. The scanning process is typically energy intensive and thus can consume significant battery power of each wireless device. Thus in the aforementioned situation, both devices scan for available Wi-Fi networks independently of one another. Since both devices are located in proximity to each other, the devices will, in many cases, both be within the physical range of one or more available Wi-Fi networks. Thus at least some of the results of the scan on each device will be the same. In the present Wi-Fi example, the results can contain the profiles or identifiers of one or more Wi-Fi networks identified during the scan. Therefore since the results of the Wi-Fi scan can be similar or identical on both wireless devices, the process of simultaneous scanning on both devices is an inefficient use of battery power on one of the devices. Consequently the scanning process on the second device is redundant if the second device has access to the scanning results obtained on the first device. In such a case, the battery power of the second device is consumed needlessly.

Therefore according to one aspect of the present disclosure, the above-noted redundancy can be minimized or eliminated by performing the scanning on one of the two paired wireless devices, and then sharing the results of the scan with the other of the two paired devices.

Figure 2:
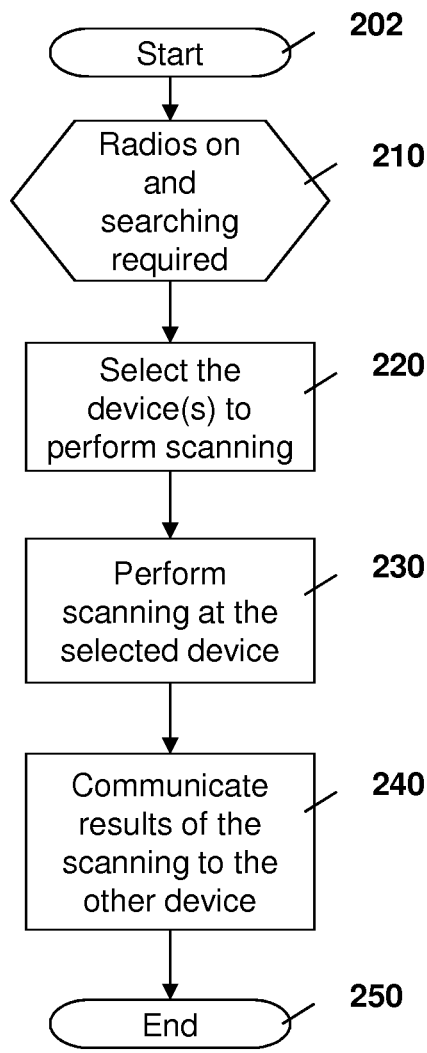
FIG. 2 is a flow chart showing steps of a method according to one aspect of the present disclosure.

The basic steps of a method according to one aspect of the present disclosure are shown in FIG. 2. In the embodiment of FIG. 2, it is assumed that the mobile devices have radios that are turned on, but the considered radio access technology (RAT) is unavailable in the communications environment, thus necessitating searching, as shown by block 210.

Specifically, FIG. 2 provides a flow chart which starts at block 202 with the preconditions of block 210, and proceeds to block 220. In block 220 one of the two or more wireless devices is selected to perform the wireless network scanning.

The process then proceeds to block 230 where the selected wireless device performs the scanning.

The process then proceeds to block 240 where the results of the scanning are communicated to the other of the wireless devices. In one embodiment, if there is no network or RAT found, such results are not communicated with the other device.

The process then proceeds to block 250 and ends.

The above method is now described in more detail.

As discussed above, in at least one aspect of the present disclosure there are at least two wireless devices, the devices are proximally located, and the devices are capable of communicating with one another. The two devices are aware of one another or are able of discovering each other. Solutions to this latter requirement are known to those skilled in the art. For example, the two devices may be capable of discovering each other wirelessly via Bluetooth, WLAN, etc., or over a wired connection, such as USB. Other solutions are possible.

Once the two wireless devices are aware of one another, each of the two devices may know or be capable of learning of the wireless capabilities of the other device. The devices in some instances will need to know of each other's wireless capabilities before there can be an attempt to perform the wireless scanning at only one of the devices. For example, if it turns out that the devices do not share any wireless capabilities in common, then it may not be possible to perform the scanning process at only one of the devices. On the other hand, it may be possible to do so when the two devices share one or more wireless capabilities. For example, if both devices are Wi-Fi enabled, then it will be possible to carry out the Wi-Fi scanning task at only one of the devices.

The wireless capabilities of a device may be communicated to the other device over a communication link between the two devices. For Example, each device may by default provide its communication capabilities, battery capacity and/or level, battery status or other relevant information (such as being charged from wall charger etc.) to the other device. Once a connection has been established between the two devices, the devices are "paired" together. This was described above with reference to FIG. 1. It is also possible that the two devices have previously been in communication, and thus are already aware of each other's wireless capabilities. In such a situation, the devices need not exchange information on their wireless capabilities each time the two devices are connected together.

In another embodiment, it is possible that only one of the devices learns of the other device's wireless capabilities. In such an embodiment, a first device may be designated to perform the scanning. Thus the first device will need to know of the wireless capabilities of the second device. However, the second device need not necessarily know of the wireless capabilities of the first device.

In many situations, the two paired devices will want to connect to a wireless network of the same type. According to one aspect of the present disclosure, this situation will be recognized and there will be an attempt to have the scanning process performed on only one of the devices. Having reference to FIG. 2, a first block 220 in a method of the present disclosure involves selecting a one of the first and second wireless devices to perform the scanning.

In a further embodiment, scanning may be shared between the devices. For example, in WLAN devices, a first device may scan 802.11b/g and a second device will scan 802.11a. At the end of the scanning the devices exchange results. From FIG. 2, the allocation of the scanning can be done at block 220, the scanning performed at each of the devices at block 230, and the sharing of the results at block 240.

The selection of the specific wireless device that is to perform the scanning can be based on any criterion or criteria.

In at least one embodiment of the present disclosure, both first and second wireless devices will be battery powered. In this embodiment, the selection of the device that is to perform the scanning will be based at least partly on the battery properties of the devices. For example, the selection can be based on the relative battery energy storage capacities of the first and second wireless devices. One measure of battery storage capacity is the electric charge capacity of the battery. For example, in many battery powered electronic devices, the electric charge of a battery is expressed in the unit milliampere-hour (mAh). In many instances, it will be desirable to select as the scanning device the device having the greater battery storage capacity. For example, a tablet computer will typically have a larger battery capacity than a smart phone. Thus in such a case it may be desirable to have the tablet computer perform the scanning.

In another embodiment, the selection of the device to perform the scanning can be based on the relative battery energy levels of the first and second wireless devices. The term "battery energy level" refers to the amount of energy remaining in a battery. Thus in at least one embodiment of the present disclosure, the device selected to perform the scanning can be the one having the greater battery energy level.

It is also possible to use other battery measurements or characteristics in selecting the device that will perform the scanning. For example, one measure that may be used is the proportion of the amount of energy remaining in the battery to the overall capacity of the battery. This measure can be referred to as battery "charge level". For example, it common to refer to the charge remaining in a battery by way of a percentage (e.g. a battery is at 70% of capacity). In such a case, the device that is to perform the scanning can be selected based on the relative charge levels of the batteries of the two devices. In at least one embodiment, the device having the greater charge level is selected to perform the scanning.

Where the selection of the device that is to perform the scanning is based on characteristics of the batteries of the two devices, it will be necessary for there to be an exchange of battery information between the two devices. This can occur when the two wireless devices initially connect to one another, or at a later time, such as when it is recognized that the two paired devices wish to connect to a wireless network of the same type. Signalling may thus exist to request or provide information between the devices.

The actual selection or designation of the device to do the scanning can be carried out in one of several different ways. For example, in at least one embodiment, the selection or designation of one of the two wireless devices as the scanning device can be performed at one of the devices. As discussed above, the selection may be based on one or more criteria, including battery related characteristics of the devices. Such conditions can be provided within software loaded onto the device at the time of manufacture or later provisioned to the device, for example. In addition, the information on which the selection is based may be stored on one or more of the two devices, and/or it may be entered by a user of one of the devices. For example, the selection can be based on user-inputted information. For instance, a user may input into one of the devices a selection to have the device having the larger battery capacity to perform the scanning. In another situation, a user may directly designate the device that is to do the scanning. Other options for selecting the scanning device are possible.

After the device that is to do the scanning has been selected, the selected device performs the scanning in search of one or more wireless networks. This is shown in block 230 in FIG. 2. The type of scanning that is performed will depend on the type of wireless network the two devices are attempting to connect to. For example, if the devices are seeking to connect to a Wi-Fi network, the scanning device will scan for available Wi-Fi networks. In another example, if the devices are seeking to connect to a user owned smaller area cell (also referred to as a femtocell or a Closed Subscriber Group (CSG)), the scanning device will scan for available femtocells. In a further example, both mobile devices may support Third Generation (3G) and Second Generation (2G) networks, supporting 3G bands 1, 2, 5, 6 and 2G GSM 850, 900, 1800 and 1900. If both devices are turned on simultaneously in a new location, the devices can share network scanning responsibility. For example, a first device can scan the 2G RAT while the second device can scan the 3G RAT, and the results can then be shared. Such implementation may increase the system scan efficiency by multi-party measurements.

In at least one embodiment of the present disclosure, the scanning process on the selected device will only commence or proceed while the battery energy level of the selected device is above a specific threshold. For example, a user may not want the device to perform any battery intensive scanning if the battery energy level is at or below a certain critical threshold. The specific threshold can be set in any suitable way, including being inputted by a user.

In addition, if and when the battery energy level of the selected wireless device reaches or falls below the specific threshold, a scanning-ceased indicator can be communicated from the selected device to the other device, possibly over the communication link between the two devices. The scanning-ceased indicator can indicate to the other device that the wireless network scanning at the selected wireless device has ceased. The other device may then determine if wishes to perform its own network scanning.

In addition, the scanning may involve one or both of active and passive scanning. As will be appreciated by those skilled in the art, active scanning involves sending request or probe signals on one or more channels or frequencies, and then waiting for a response. On the other hand, passive scanning involves listening on a specific channel or frequency for one or more periodic beacon transmissions from an access point or base station.

Once the scanning has been carried out, the scanning device will have the results of the scan. The results will include information on the available wireless networks. In the case where no wireless networks were identified, the results can indicate this outcome. The information on the available networks may include an identifier and/or a profile of each network. The information may also include other information for each available wireless network, such as for example connection and/or transmission parameters. In at least one embodiment of the present disclosure, the results will contain sufficient information on one or more of the available wireless networks to enable the other (i.e. non-scanning device) to connect to one of the networks without having to perform any scanning on its own.

Once the wireless network scanning has been performed, the results of the search can then be communicated to or otherwise shared with the other device. In a further embodiment, the searching may continue and the results reported only in a searched network is found. This is shown in block 240 in FIG. 2.

In at least one embodiment, the results will be communicated between the two devices 110, 112 over communication link 120. The communication of the results may be accomplished in any suitable way. For example, the device that performed the scanning can push the results over to the other device. Another option is to have scanning device notify the other device that the scanning is complete. The other device may then request the results from the scanning device. In yet a further embodiment, the other device may poll the scanning device for the results. Other solutions are possible and are within the knowledge of the skilled person.

As mentioned above, in at least one embodiment of the present disclosure, the results of the scanning will contain sufficient information on one or more of the available wireless networks to enable the other (i.e. non-scanning device) to connect to one of the networks without having to perform any scanning on its own. This will enable the non-scanning device to connect to an available wireless network without having to carry out the battery intensive scanning process.

After the scanning process is complete, one or both of the devices can establish a connection with one or more of the networks identified during the scan.

In the disclosure below, several aspects of the present disclosure are described with reference to two different exemplary wireless network architectures.

Figure 3:
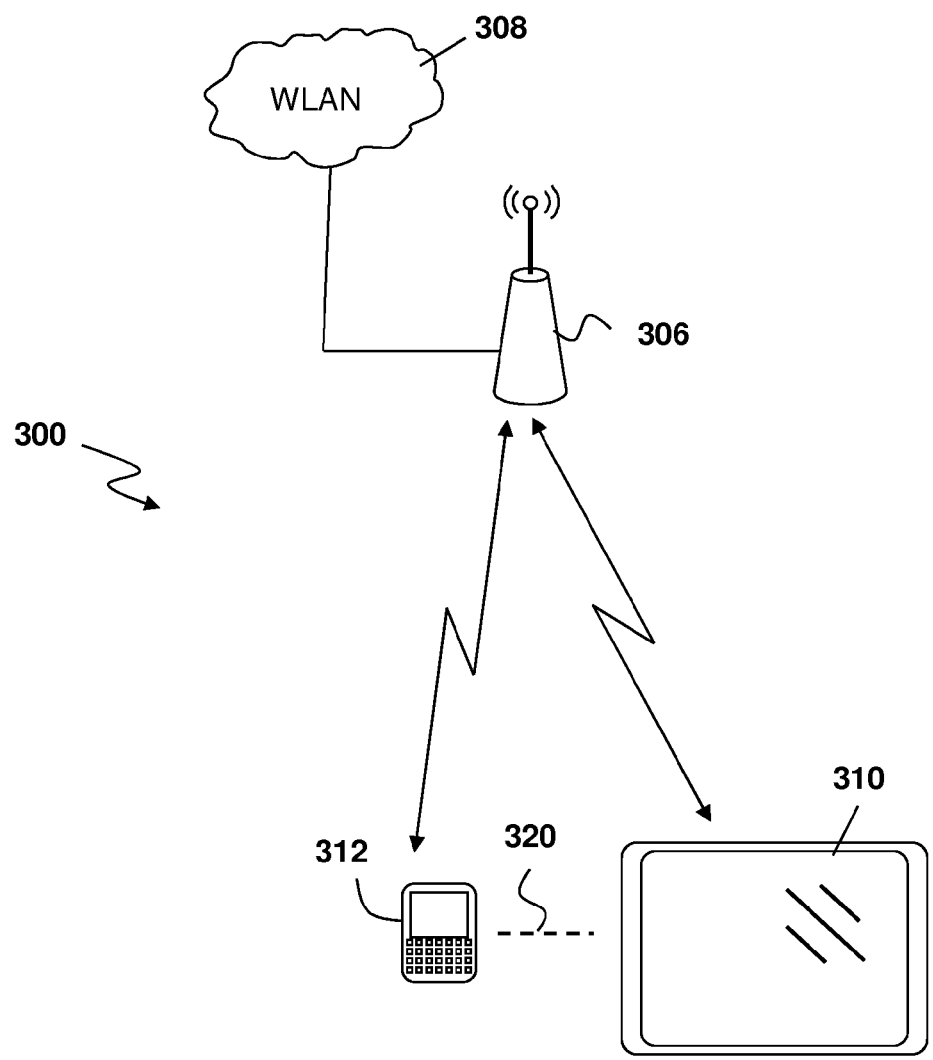
FIG. 3 is a block diagram representing an exemplary wireless local area network according to one aspect of the present disclosure.

Reference is now made to FIG. 3, which shows a block diagram representing an exemplary wireless local area network (WLAN) 300 comprising an access point 306 and first and second wireless devices 310, 312. Devices 310, 312 are interconnected by way of communication link 320. Access point 306 may be connected to another network 308, such as for example a local area network (LAN), the internet, etc. Although only two wireless devices are shown in WLAN 300, it is to be appreciated that WLAN 300 can have one or more other computing devices, such as mobile devices and other types of wireless devices.

One or more of the methods of the present disclosure for scanning may be implemented in the exemplary architecture shown in FIG. 3. For example, device 310 could be selected to perform the scanning, and then actually carry out the scanning process. Device 310 would identify WLAN network 300, and in particular access point 306. The results of the scan, which can include information on network 300 and access point 306, such as a network identifier, WLAN profile, etc., would then be communicated to or otherwise shared with device 312. This information would then enable device 312 to establish a connection with access point 306 without itself having to do any scanning for WLAN network 300. Thus device 312 is able to preserve battery power that it would have otherwise expended in scanning for network 300.

Figure 4:
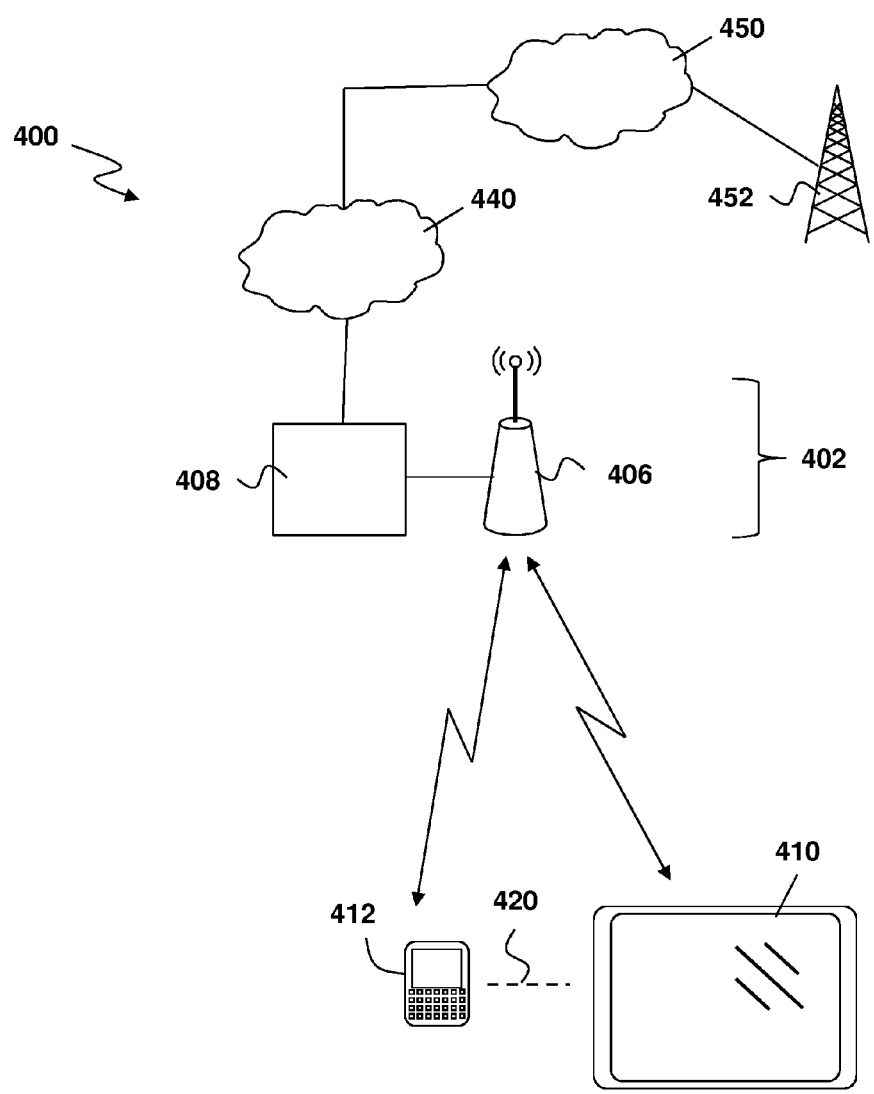
FIG. 4 is a block diagram representing an exemplary telecommunications architecture comprising a Closed Subscriber Group network according to one aspect of the present disclosure.

Reference is now made to FIG. 4, which shows a block diagram representing an exemplary telecommunications architecture 400 comprising a femtocell 402. As will be appreciated by those skilled in the art, a femtocell is a user owned limited coverage area cellular base station that is connected to a telecommunications service provider's core network via the internet. In FIG. 4, femtocell 402 includes femtocell base station 406, an internet modem 408, and first and second wireless devices 410 and 412. Internet modem provides an interface between base station 406 and the internet 440. The service provider's core network 450 is connected to the internet 440. Core network 450 comprises one or more base stations 452.

Femtocell 402 may be configured in a number different ways. For example, the network can be configured in closed subscriber group (CSG) mode. In CSG mode, only specific users are permitted to use the femtocell resources. Alternatively, femtocell 402 could be configured in an Open Access mode, wherein all users may access the femtocell.

In addition to the elements shown in FIG. 4, telecommunications architecture 400 may also include other components. For example, a security gateway may exist between the internet and the provider's core network in order to secure the internet connection between a femtocell and the core network. In addition, the core network will typically have a femtocell device management system (FMS) for the provisioning, activation, and management of femtocells. Telecommunications architecture 400 may also have other components and connections. It is to be appreciated that telecommunications architecture 400 shown in FIG. 4 is merely exemplary. Neither its components nor its configuration is meant to be limiting.

The embodiments of the present disclosure may be implemented in a configuration such as the one depicted in FIG. 4. For example, when wireless devices 410 and 412 seek to establish a connection with access point 406 in femtocell 402, the process of searching for one or more femtocell base station can be performed on only one of the devices. In the example shown in FIG. 4, the scanning device is device 410. Once the scanning is complete, the results of the scan can be communicated from device 410 to device 412 via communication link 420 to enable device 412 to connect to femtocell base station 406 without itself having to perform any scanning.

The results of the scan can include information about any discovered femtocells. In the case where no femtocells were identified, the results can indicate this outcome. The information on the available femtocells may include an identifier of each femtocell. The information may also include other information for each available femtocell, such as for example connection and/or transmission parameters. In at least one embodiment of the present disclosure, the results will contain sufficient information on one or more of the available femtocells to enable the other (i.e. non-scanning device) to connect to one of the femtocells without having to perform any scanning on its own.

The arrangements depicted in FIGS. 3 and 4 are only exemplary and are not meant to be limiting. Implementations of the present disclosure can be realized with many other radio access technologies and network architectures.

In addition to the foregoing, the present disclosure also contemplates one or more wireless devices capable of implementing at least part of one or more of the methods described above.

According to at least one aspect of the present disclosure, a wireless device is provided. The wireless device is capable of communicating with another wireless device. The wireless device comprises a processor, a memory storing therein computer readable instructions, and at least one wireless communication interface for communicating with one or more wireless networks. The processor is configured to execute the computer readable instructions to cause the wireless device to scan for wireless networks using the at least one wireless communication interface, and to communicate the results of the scan to the another wireless device. In at least one embodiment, rather than communicating the results to the other device, the device can merely make the results available to the other device.

Figure 5:
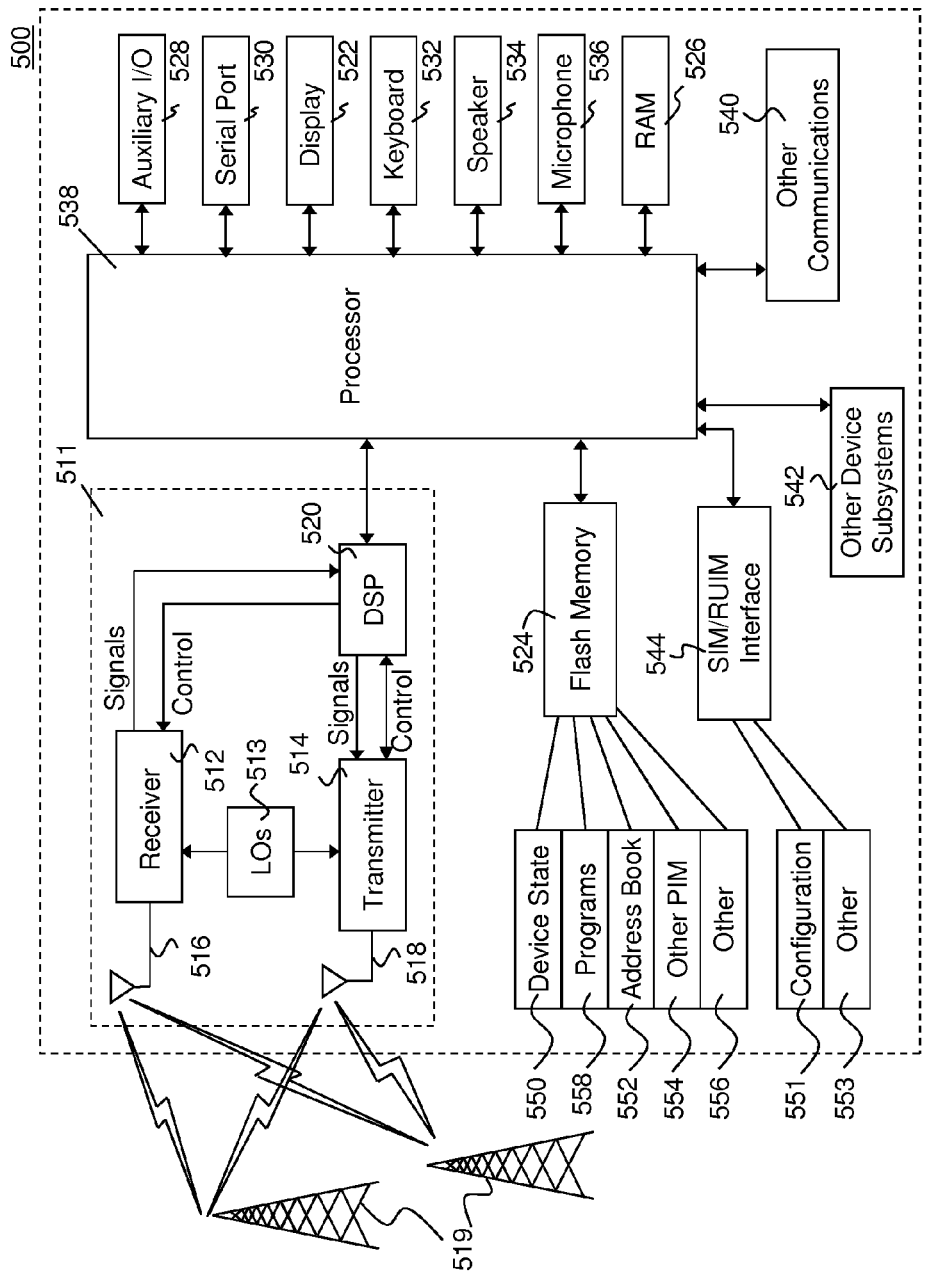
FIG. 5 is a block diagram representing a mobile device according to one aspect of the present disclosure.

An example of such a wireless device is a mobile device depicted in FIG. 5. The mobile device of FIG. 5 is however not meant to be limiting and other wireless devices could also be used.

Mobile device 500 may comprise a two-way wireless communication device having any of voice capabilities, data communication capabilities, or both. Mobile device 500 generally has the capability to communicate with other devices or computer systems. Depending on the exact functionality provided, the mobile device may be referred to as a data messaging device, a two-way pager, a wireless e-mail device, a cellular telephone with data messaging capabilities, a wireless Internet appliance, a wireless device, a user equipment, a tablet, or a data communication device, as examples.

Where mobile device 500 is enabled for two-way communication, it may incorporate a communication subsystem 511, including both a receiver 512 and a transmitter 514, as well as associated components such as one or more antenna elements 516 and 518, local oscillators (LOs) 513, and a processing module such as a digital signal processor (DSP) 520. As will be apparent to those skilled in the field of communications, the particular design of the communication subsystem 511 will be dependent upon the communication network in which the device is intended to operate.

Where mobile device 500 is enabled for two-way communication, it may incorporate a communication subsystem 511, including both a receiver 512 and a transmitter 514, as well as associated components such as one or more antenna elements 516 and 518, local oscillators (LOs) 513, and a processing module such as a digital signal processor (DSP) 520. As will be apparent to those skilled in the field of communications, the particular design of the communication subsystem 511 will be dependent upon the communication network in which the device is intended to operate.

Network access requirements will also vary depending upon the type of network 519. In some networks, network access is associated with a subscriber or user of mobile device 500. A mobile device may require a removable user identity module (RUIM) or a subscriber identity module (SIM) card in order to operate on the network. The SIM/RUIM interface 544 may be similar to a card-slot into which a SIM/RUIM card can be inserted and ejected like a diskette or PCMCIA card. The SIM/RUIM card can have memory and hold many key configuration 551, and other information 553 such as identification, and subscriber related information.

When required network registration or activation procedures have been completed, mobile device 500 may send and receive communication signals over the network 519. As illustrated in FIG. 5, network 519 can consist of multiple base stations communicating with the mobile device. For example, in a hybrid CDMA 1×EVDO system, a CDMA base station and an EVDO base station communicate with the mobile station and the mobile device is connected to both simultaneously. In other systems such as Long Term Evolution (LTE) or Long Term Evolution Advanced (LTE-A), multiple base stations may be connected to for increased data throughput. Other systems such as GSM, GPRS, UMTS, HSDPA, among others are possible and the present disclosure is not limited to any particular cellular technology.

Signals received by antenna 516 through communication network 519 are input to receiver 512, which may perform such common receiver functions as signal amplification, frequency down conversion, filtering, channel selection and the like, and in the example system shown in FIG. 5, analog to digital (A/D) conversion. A/D conversion of a received signal allows more complex communication functions such as demodulation and decoding to be performed in the DSP 520. In a similar manner, signals to be transmitted are processed, including modulation and encoding for example, by DSP 520 and input to transmitter 514 for digital to analog conversion, frequency up conversion, filtering, amplification and transmission over the communication network 519 via antenna 518. DSP 520 not only processes communication signals, but also provides for receiver and transmitter control. For example, the gains applied to communication signals in receiver 512 and transmitter 514 may be adaptively controlled through automatic gain control algorithms implemented in DSP 520.

Mobile device 500 generally includes a processor 538 which controls the overall operation of the device. Communication functions, including data and voice communications, are performed through communication subsystem 511. Processor 538 also interacts with further device subsystems such as the display 522, flash memory 524, random access memory (RAM) 526, auxiliary input/output (I/O) subsystems 528, serial port 530, one or more keyboards or keypads 532, speaker 534, microphone 536, other communication subsystem 540 such as a short-range communications subsystem and any other device subsystems generally designated as 542. Serial port 530 could include a USB port or other port known to those in the art having the benefit of the present disclosure.

Some of the subsystems shown in FIG. 5 perform communication-related functions, whereas other subsystems may provide "resident" or on-device functions. Notably, some subsystems, such as keyboard 532 and display 522, for example, may be used for both communication-related functions, such as entering a text message for transmission over a communication network, and device-resident functions such as a calculator or task list, among other applications.

Operating system software used by the processor 538 may be stored in a persistent store such as flash memory 524, which may instead be a read-only memory (ROM) or similar storage element (not shown). Those skilled in the art will appreciate that the operating system, specific device applications, or parts thereof, may be temporarily loaded into a volatile memory such as RAM 526. Received communication signals may also be stored in RAM 526.

As shown, flash memory 524 can be segregated into different areas for both computer programs 558 and program data storage 550, 552, 554 and 556. These different storage types indicate that each program can allocate a portion of flash memory 524 for their own data storage requirements. The applications may be segregated based on the mode or category they fall into. Memory 524 may further provide security for corporate data and if some applications are locked while others are not.

Processor 538, in addition to its operating system functions, may enable execution of software applications on the mobile device. A predetermined set of applications that control basic operations, including data or voice communication applications for example, will normally be installed on mobile device 500 during manufacturing. Other applications could be installed subsequently or dynamically.

Applications and software may be stored on any computer readable storage medium. The computer readable storage medium may be a tangible or intransitory/non-transitory medium such as optical (e.g., CD, DVD, etc.), magnetic (e.g., tape) or other memory known in the art.

One example software application may be a personal information manager (PIM) application having the ability to organize and manage data items relating to the user of the mobile device such as, but not limited to, e-mail, calendar events, voice mails, appointments, and task items. Further applications, including, but not limited to, a media player, camera, messenger, mail, calendar, address book, web browser, social networking, game, electronic book reader, map, or other application may also be loaded onto the mobile device 500 through the network 519, an auxiliary I/O subsystem 528, serial port 530, short-range communications subsystem 540 or any other suitable subsystem 542, and installed by a user in the RAM 526 or a non-volatile store (not shown) for execution by the processor 538. Such flexibility in application installation increases the functionality of the device and may provide enhanced on-device functions, communication-related functions, or both. For example, secure communication applications may enable electronic commerce functions and other such financial transactions to be performed using the mobile device 500.

In a data communication mode, a received signal such as a text message or web page download will be processed by the communication subsystem 511 and input to the processor 538, which may further process the received signal for output to the display 522, or alternatively to an auxiliary I/O device 528.

A user of mobile device 500 may also compose data items such as email messages for example, using a keyboard 532, which may comprise a virtual or physical keyboard or both, and may include a complete alphanumeric keyboard or telephone-type keypad, among others, in conjunction with the display 522 and possibly an auxiliary I/O device 528. Such composed items may then be transmitted over a communication network through the communication subsystem 511.

For voice communications, overall operation of mobile device 500 is similar, except that received signals would typically be output to one or more speakers 534 and signals for transmission would be generated by a microphone 536. Alternative voice or audio I/O subsystems, such as a voice message recording subsystem, may also be implemented on mobile device 500. Although voice or audio signal output may be accomplished primarily through the one or more speakers 534, display 522 may also be used to provide an indication of the identity of a calling party, the duration of a voice call, or other voice call related information for example.

Serial port 530 in FIG. 5 would normally be implemented in a personal digital assistant (PDA)-type mobile device for which synchronization with a user's desktop computer (not shown) may be desirable, but is an optional device component. Such a port 530 would enable a user to set preferences through an external device or software application and would extend the capabilities of mobile device 500 by providing for information or software downloads to mobile device 500 other than through a wireless communication network. The alternate download path may for example be used to load an encryption key onto the device through a direct and thus reliable and trusted connection to thereby enable secure device communication. As will be appreciated by those skilled in the art, serial port 530 can further be used to connect the mobile device to a computer to act as a modem. In addition, serial port 530 can be used to establish a communication link between two wireless devices, such as communication link 120 shown between devices 110 and 112 in FIG. 1. As described above, serial port 530 can support any type of serial communication, including but not limited to USB.

Other communications subsystems 540, such as a short-range communications subsystem, are further optional components which may provide for communication between mobile device 500 and different systems or devices, which need not necessarily be similar devices. For example, the subsystem 540 may include an infrared device and associated circuits and components, near field communications (NFC) or a Bluetooth™ communication module to provide for communication with similarly enabled systems and devices. Subsystem 540 can be used to establish a communication link between device 500 and another wireless device, such as communication link 120 between devices 110 and 112 in FIG. 1.

The embodiments described herein are examples of structures, systems or methods having elements corresponding to elements of the techniques of this application. This written description may enable those skilled in the art to make and use embodiments having alternative elements that likewise correspond to the elements of the techniques of this application.

The intended scope of the techniques of this application thus includes other structures, systems or methods that do not differ from the techniques of this application as described herein, and further includes other structures, systems or methods with insubstantial differences from the techniques of this application as described herein Moreover, the previous detailed description is provided to enable any person skilled in the art to make or use the present disclosure. Various modifications to those embodiments will be readily apparent to those skilled in the art, and the generic principles defined herein may be applied to other embodiments without departing from the spirit or scope of the disclosure described herein. Thus, the present disclosure is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

What is claimed:

1. A first wireless device comprising:
   a processor;
   a memory storing therein computer readable instructions; and
   at least one wireless communication interface for communicating with one or more wireless networks,
   wherein the processor and the wireless communication interface cooperate to:
      recognize a second wireless device, the second wireless device being separate from the first wireless device;
      select the second wireless device as at least one device to perform wireless network scanning to discover one or more available wireless networks, the selection of the second wireless device being based on at least one selection criterion, the at least one selection criterion including a battery related property of at least one of the first and second wireless devices; and
      receive results of wireless network scanning performed on the second wireless device, the results containing information enabling the first wireless device to connect to at least one available wireless network discovered during the scanning without the first wireless device having to perform the same wireless network scanning.

2. The first wireless device of claim 1, wherein the processor and the wireless communication interface further cooperate to receive, prior to the selecting, an indication from the second wireless device that the second wireless device is to be selected as the at least one device to perform the wireless network scanning.

3. The first wireless device of claim 1, wherein the processor and the wireless communication interface further cooperate to:
   perform, by the first wireless device, wireless network scanning to discover one or more available wireless networks; and
   communicate results of the scanning by the first wireless device to the second wireless device, the results containing information to enable the second wireless device to connect to at least one of the one or more available wireless networks without the second wireless device having to perform the same wireless network scanning.

4. The first wireless device of claim 1, wherein the processor and the wireless communication interface further cooperate to receive a scanning-ceased indicator from the second wireless device indicating that the wireless network scanning at the second wireless device has ceased prematurely.

5. The first wireless device of claim 1 wherein the battery related property includes relative battery energy storage capacities of the first and second wireless devices.

6. The first wireless device of claim 1 wherein the battery related property includes relative battery energy levels of the first and second wireless devices.

7. The first wireless device of claim 1 wherein the battery related property includes relative charge levels of the first and second wireless devices.

8. The first wireless device of claim 1, wherein the processor and the wireless communication interface further cooperate to receive information on the wireless capabilities of the second wireless device.

9. The first wireless device of claim 1, wherein the processor and the wireless communication interface further cooperate to send information on the wireless capabilities of the first wireless device to the second wireless device.

10. The first wireless device of claim 1, wherein the processor and the wireless communication interface further cooperate to, after the receiving, connect to at least one available wireless network discovered during the scanning using the results of the scanning.

11. A non-transitory computer-readable storage medium storing instructions that when executed by at least one processor of a first wireless device cause the performance of operations comprising:
    recognizing a second wireless device, the second wireless device being separate from the first wireless device;
    selecting the second wireless device as at least one device to perform wireless network scanning to discover one or more available wireless networks, the selection of the second wireless device being based on at least one selection criterion, the at least one selection criterion including a battery related property of at least one of the first and second wireless devices; and
    receiving results of wireless network scanning performed on the second wireless device, the results containing information enabling the first wireless device to connect to at least one available wireless network discovered during the scanning without the first wireless device having to perform the same wireless network scanning.

12. The non-transitory computer-readable storage medium of claim 11, wherein the instructions further cause receiving, prior to the selecting, an indication from the second wireless device that the second wireless device is to be selected as the at least one device to perform the wireless network scanning.

13. The non-transitory computer-readable storage medium of claim 11, wherein the instructions further cause:
    performing, by the first wireless device, wireless network scanning to discover one or more available wireless networks; and
    communicating results of the scanning by the first wireless device to the second wireless device, the results containing information to enable the second wireless device to connect to at least one of the one or more available wireless networks without the second wireless device having to perform the same wireless network scanning.

14. The non-transitory computer-readable storage medium of claim 11, wherein the instructions further cause receiving a scanning-ceased indicator from the second wireless device indicating that the wireless network scanning at the second wireless device has ceased prematurely.

15. The non-transitory computer-readable storage medium of claim 11 wherein the battery related property includes relative battery energy storage capacities of the first and second wireless devices.

16. The non-transitory computer-readable storage medium of claim 11 wherein the battery related property includes relative battery energy levels of the first and second wireless devices.

17. The non-transitory computer-readable storage medium of claim 11 wherein the battery related property includes relative charge levels of the first and second wireless devices.

18. The non-transitory computer-readable storage medium of claim 11, wherein the instructions further cause receiving information on the wireless capabilities of the second wireless device.

19. The non-transitory computer-readable storage medium of claim 11, wherein the instructions further cause sending information on the wireless capabilities of the first wireless device to the second wireless device.

20. The non-transitory computer-readable storage medium of claim 11, wherein the instructions further cause, after the receiving, connecting by first wireless device to at least one available wireless network discovered during the scanning using the results of the scanning.

\* \* \* \* \*